June 18, 1957 R. P. LAMBECK 2,796,137
PITCH LOCK WITH MECHANICAL LATCH
Filed Aug. 19, 1953 4 Sheets-Sheet 1

INVENTOR
RAYMOND P. LAMBECK
BY
ATTORNEY

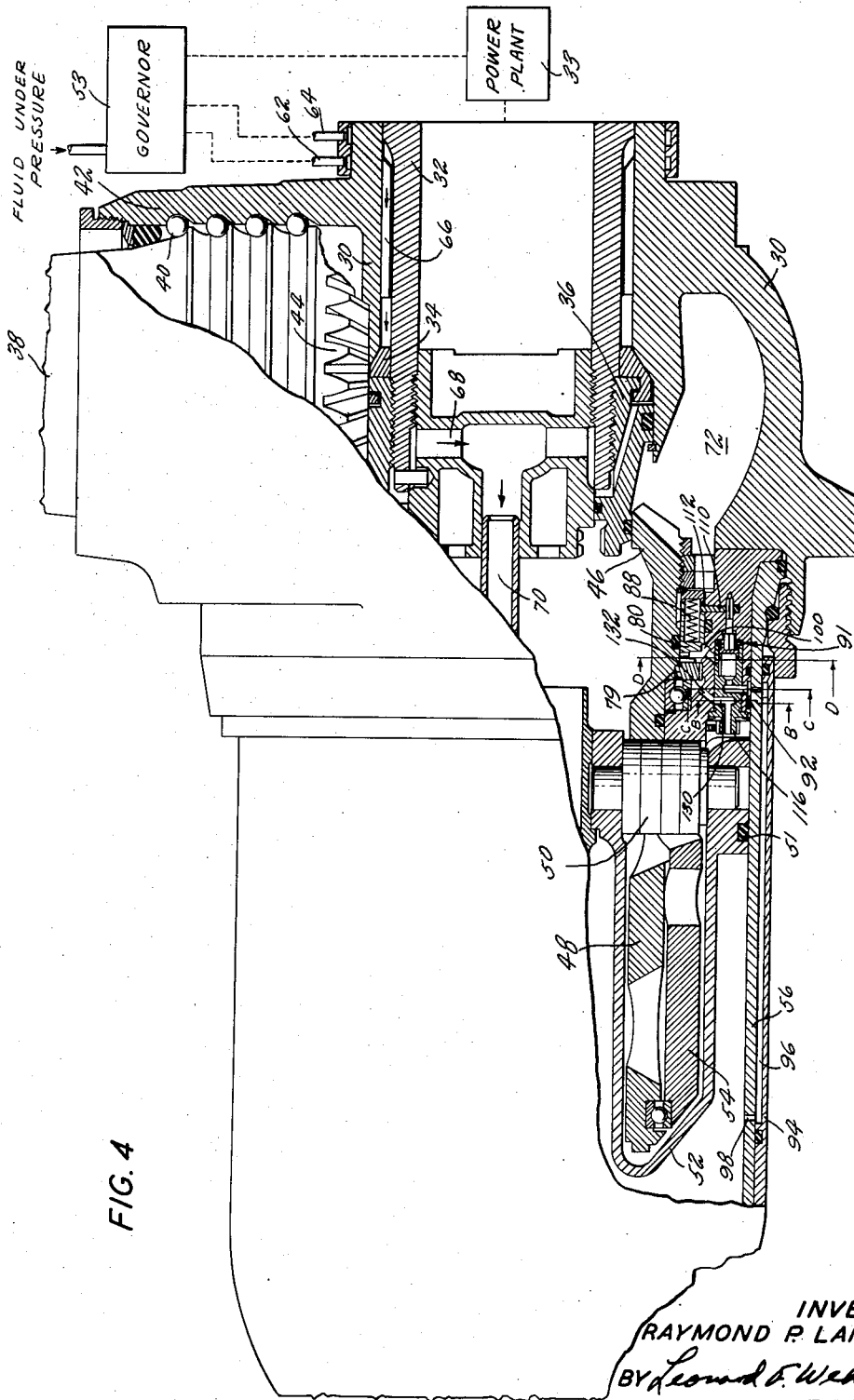

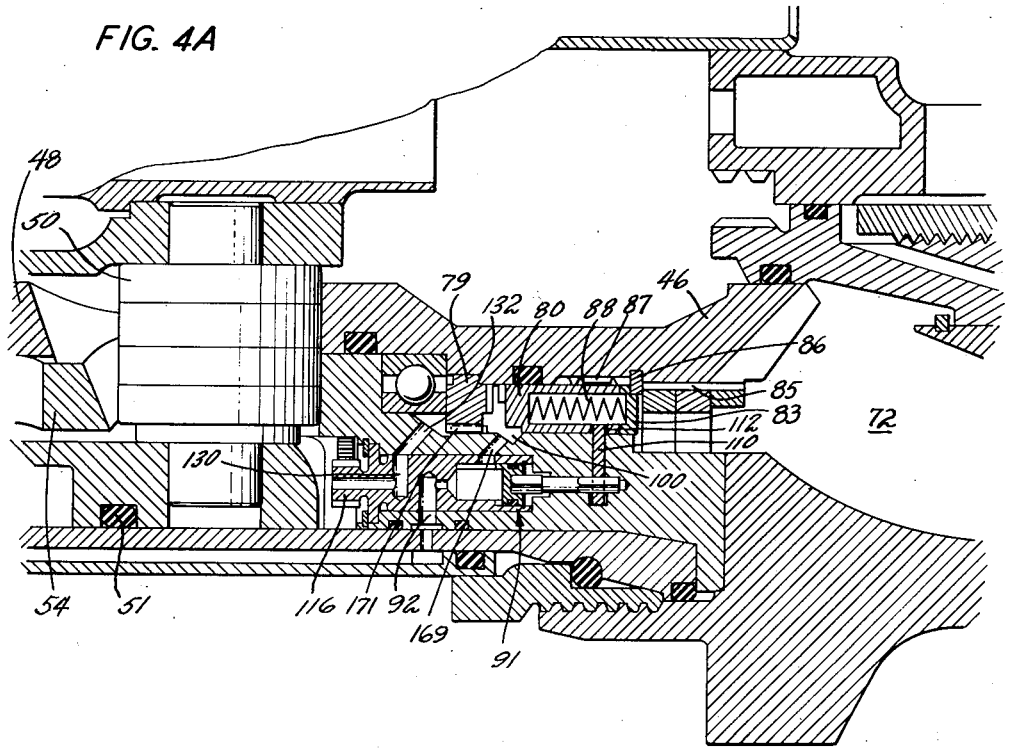

June 18, 1957  R. P. LAMBECK  2,796,137
PITCH LOCK WITH MECHANICAL LATCH
Filed Aug. 19, 1953  4 Sheets-Sheet 4

INVENTOR
RAYMOND P. LAMBECK
BY Leonard P. Wakeland
ATTORNEY

United States Patent Office 2,796,137
Patented June 18, 1957

2,796,137
PITCH LOCK WITH MECHANICAL LATCH

Raymond P. Lambeck, Manchester, Conn., assignor to United Aircraft Corporation, East Hartford, Conn., a corporation of Delaware Application August 19, 1953, Serial No. 375,167

9 Claims. (Cl. 170—160.21)

This invention relates to variable pitch propellers and more particularly to propellers having positive blade pitch locks.

It is an object of this invention to provide a variable pitch propeller having a positive pitch lock for preventing blade pitch variation under certain conditions.

It is a further object of this invention to provide a pitch lock for a variable pitch propeller wherein the pitch lock mechanism responds to the speed of rotation of the propeller to lock the blades against pitch changing movement.

It is another object of this invention to provide a pitch lock for a variable pitch propeller including a latch for the lock.

A still further object of this invention is to provide a mechanical latch for a fluid operated pitch lock which will maintain the lock in an unlocked position in the event of a loss of pressure but will permit a lock-up when a propeller overspeed condition exists.

An additional object of this invention is to provide a pitch lock which cannot be unlocked until propeller R. P. M. has returned to a normal value and the propeller is able to change pitch toward a higher blade angle.

These and other objects of this invention will become readily apparent from the following detail description of the drawings in which:

Fig. 4 is a partial cross-sectional illustration of a typical embodiment of this invention in a propeller mechanism.

Fig. 4A is an enlarged detailed cross section of a portion of Fig. 4 illustrating the lock mechanism.

Figure 1:
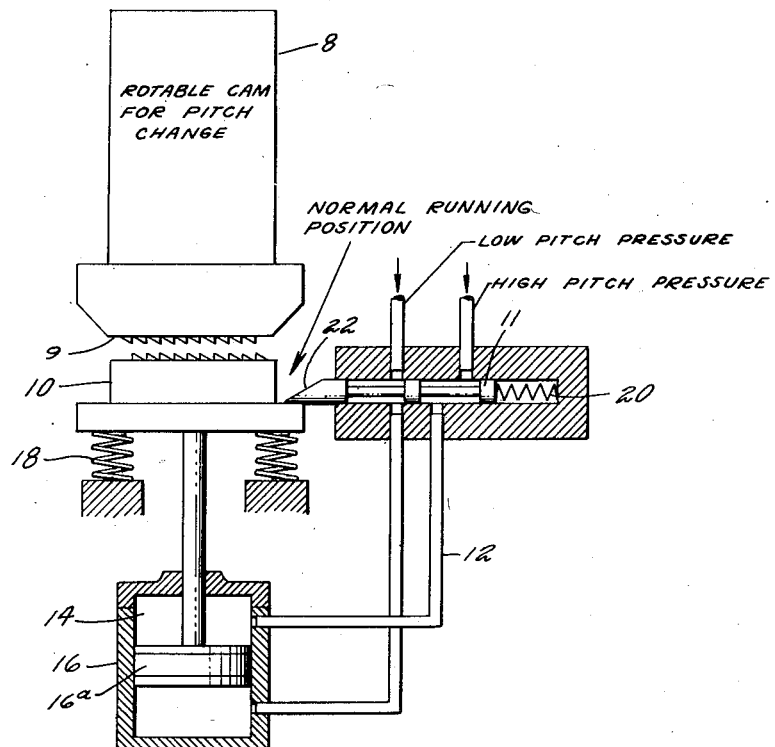
Figs. 1 to 3 are schematic illustrations of the pitch lock and latch in various operating positions.
Figure 2:
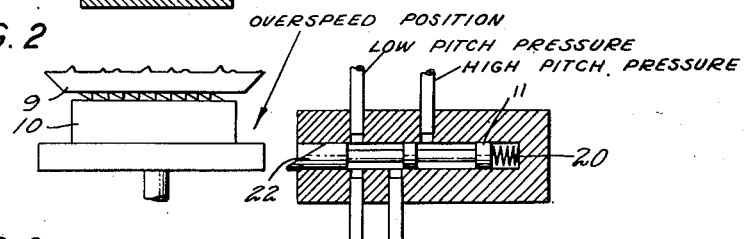
Figure 3:
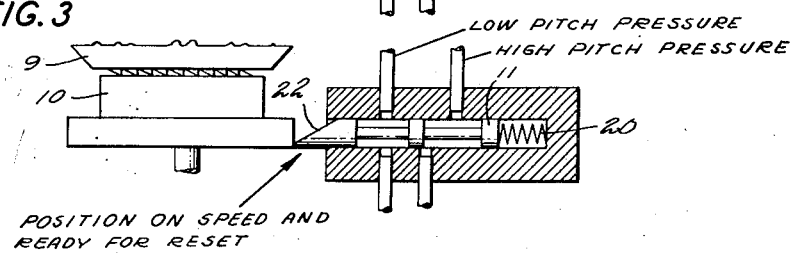

In fluid operated mechanical pitch locks for variable pitch propellers it is desirable to maintain the pitch lock in an unlocked position in the event of a loss of operating pressure until there is an actual overspeed condition of the propeller. Figs. 1 through 3 illustrate schematically a simple form of providing this desirable result. Fig. 1 illustrates a rotatable cam 8 which may be utilized for varying the pitch of the propeller blades. A typical rotatable cam including its environment is clearly illustrated and described in the Caldwell et al. Patent No. 2,174,717. The cam 8 may include a toothed element 9 adapted to be engaged by a cooperating toothed pitch lock element 10. The pitch lock element 10 would normally be fixed for rotation with the propeller hub but will be axially slidable therein. A moveable valve member 11 normally directs high pitch pressure via the line 12 to the chamber 14 of the pitch lock cylinder 16 to force the pitch lock element 10 out of engagement against the force of springs 18. The valve element 11 is biased toward the left by a spring 20 and includes a latch member 22 which normally engages the pitch lock element 10 to mechanically prevent engagement of the lock elements 9 and 10. Therefore, it is apparent that in the event there is a loss of high pitch operating pressure the pitch lock element 10 will not be able to engage with the lock element 9 until the latch member 22 is disengaged from the pitch lock element 10.

The valve 11, including the latch 22, is intended to operate as a centrifugal device so that when an overspeed condition occurs, as shown in Fig. 2, the valve will move to the right against the pressure of spring 20. Such movement will disengage the latch 22 and will conduct low pitch pressure to the chamber 14 as well as to the chamber on the opposite side of the pitch lock operating piston 16a. With the pressures equalized on either side of the piston 16a the springs 18 can then force the pitch lock element 10 into engagement with the pitch lock element 9 to lock the cam 8 as well as the blades against pitch changing movement. In this connection the relative value of the pressures on each side of the piston 16 of Fig. 1 is set forth in connection with Figs. 4 and 4A.

Fig. 3 illustrates the valve 11 and the latch 22 in an onspeed condition and ready for a reset as soon as sufficient operating pressure can disengage the pitch lock elements 9 and 10. It should be pointed out that the teeth on the pitch lock elements are so shaped so as to prevent relative movement in one pitch changing direction while permitting movement in another pitch changing direction. The reason for this type of construction is that upon a loss of operating pressure an overspeed condition is to be avoided and hence reduction of pitch is undesirable. However, in the event that the overspeed condition is cured and some operating pressure is obtained, the blades can move toward a higher pitch position since the teeth of the pitch lock elements will ratchet in that direction.

Figs. 4 and 4A illustrated a typical embodiment of the mechanism of this invention. The propeller shown in Fig. 4 comprises a hub 30 secured on a shaft 32 which may be driven by a power plant 33. The hub 30 is retained in position on the shaft 32 by the usual cones 34 and retaining nut 36. The cones 34 are of the split type to permit installation. Hub 30 carries a plurality of blades 38 mounted for pitch changing movement on bearings 40 in the hub socket 42. Each blade 38 is provided with a gear segment 44 which meshes with a common gear 46 for simultaneously turning all the blades to vary their pitch. Gear 46 is actuated by, and may be integral with, a cam 48 which is turned by the action of cam followers 50 movable by a piston 52 and cooperating with both cam 48 and a fixed cam 54. For a more detailed description of a cam and cam followers reference may be made to the above-referred to Caldwell et al. patent or Martin et al. Patent No. 2,280,713.

Piston 52 is slidable fore and aft by a preponderance of oil under pressure on one side or the other in a cylinder formed by the dome 56. The piston 52 is shown as sealed at the cylinder wall by an O-ring seal 51. From the above description it is apparent that a preponderance of pressure on either side of piston 52 will move the piston and cause a change in the pitch of the propeller blades. Oil is conducted from a governor 53 which is driven in timed relation with the propeller. Oil under pressure from the governor is led to lines 62 and 64 and acts to selectively increase the pressure in one of these lines and reduce the pressure in the other of these lines in order to move the piston 52 and control the propeller pitch to maintain a constant speed. In moving the blades toward high pitch, high pressure fluid is conducted to the line 64 where it passes through the splines 66, then to the passages 68 and 70 and eventually to the front side of the piston 52. In order to move the propeller blades toward low pitch the governor conducts high pressure fluid to the line 62 from where it is conducted to the aft side of the piston 52 and also the hub chamber 72. The relative values of the pressure of high and low pitch fluids are set forth clearly in Patent No. 2,636,566 issued April 28, 1953 to Chester J. Jedrziewski.

The pitch lock mechanism of this invention is contained within the hub structure of the propeller and comprises a toothed pitch lock element 80 which is rotatable with respect to the hub structure as the blades rotate about their respective axes, together with a second toothed pitch element 79 which is held stationary with respect to the hub structure. Each of the pitch lock elements 79 and 80 is in the form of a ring, only a single section of which is shown in Figs. 4 and 4A. The first pitch lock element 80 is connected by means of the splines 87 to the rotating cam 48 and the blade interconnecting gear 46 and is slidable in a direction parallel to the axis of rotation of the propeller hub to selectively engage with or disengage from the mating toothed pitch lock element 79.

The second pitch lock element 79 is connected by means of the splines 171 to the fixed cam 54, which in turn is not rotatable with respect to the hub structure of the propeller. Thus locking of the blade angle is accomplished by bringing the teeth of the pitch lock elements 79 and 80 together to prevent the rotating cam 48 and the fixed cam 54 from relative motion which in turn prevents blade angle change, substantially as shown in patent application Serial No. 275,051, filed March 6, 1952 by David R. Pearl, now U. S. Patent No. 2,703,148. When fluid under pressure is conducted to chamber 100, the pitch lock ring element 80 is forced to the right to compress a multiplicity of springs 88 (only one of which is shown in Fig. 4A) and the teeth of element 80 are disengaged from the teeth of element 79. Re-engagement of the teeth is accomplished by removing the pressure from the fluid in chamber 100 substantially as described below, thus allowing the springs 88 to push the teeth of element 80 into locking relation with the teeth of pitch lock ring element 79.

The right-hand ends of the springs 88 abut against a ring-like seat 83, which also serves as a limit of travel of the pitch lock element 80 in the unlocking direction. Each of the springs 88 has a chamber in which it is supported, and these chambers communicate hydraulically with the chamber 72 in order to allow the drainage of any fluid present in the spring chambers when the pitch lock ring element 80 is moved to the right, as in Fig. 4A. This drainage path leads from the chambers of springs 88 between the mutually abutting faces of rings 80 and 83, to the right along spline 87, through the clearances existing around lock ring 86 in its groove as well as through the end gap in ring 86 and to the right along spline 85.

In Fig. 4 the valve 91 is shown in cross section taken along several planes in order to show all of the passages contained therein. The actual positions of the ports are better illustrated in Fig. 6. The valve 91 is normally supplied with high pressure fluid via a passage 92. In order to conduct high pressure fluid to the passage 92 the dome 56 has a surrounding sleeve 94 including a passage 96 which cooperates with passage 98 in the dome 56 to conduct high pressure fluid from the forward side of the pitch changing piston 52 to the passage 92. In the normal position of the valve 91 fluid under pressure is conducted from the passage 92 to a chamber 100 located between the pitch lock elements 79 and 80.

Figure 7:
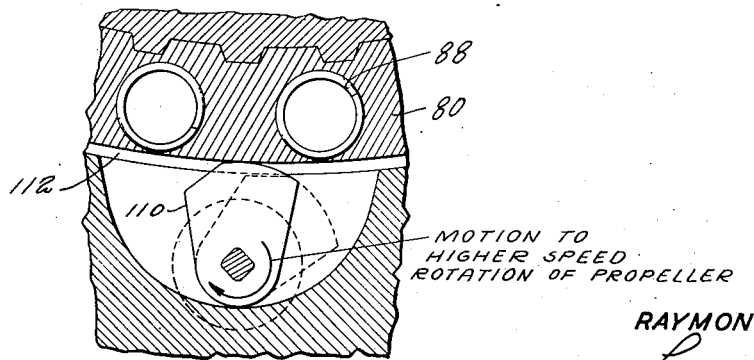
Fig. 7 is a partial detailed illustration of the latch mechanism.

Ordinarily if a loss of pressure occurs in the chamber 100 as a result of loss of pressure on the front side of the pitch changing piston 52, the lock element 80 would engage with the lock element 79. In order to prevent an immediate lock-up, unless an overspeed condition occurs, a cam 110 is provided which engages a slot 112 in the pitch lock element 80. (See also Fig. 7.) The valve 91 is also provided at the left end thereof with a gear 116 adapted to be rotated by a centrifugal member 120, shown in Fig. 5. The centrifugal member 120 is housed near the outer periphery of the dome 30 and includes a gear segment 122 at one end thereof which engages the gear 116 on the valve 91. The centrifugal member 120 is pivoted at 124 intermediate its ends. The other end of the member 120 is biased by a spring 126 of desired characteristics. The spring 126 tends to maintain the gear segment 122 in an inboard direction so that as the speed of the propeller increases, centrifugal force will urge the gear segment 122 in an outboard direction away from the axis of propeller rotation. Such movement of the gear segment 122 will rotate the valve 91 as well as the cam 110 which is fixed to the valve 91. (See Fig. 4.)

Regardless of the cause of the overspeed condition the valve 91 eventually will rotate sufficiently so as to align its port 130 (Fig. 4) with the port 132 which communicates with the pitch lock chamber 100. As seen both in Fig. 4 and in Fig. 6 this will close off the port 92 from the pitch lock chamber 100 and will connect this chamber via the passages 132 and 130 to the back side of the pitch changing piston 52. In this manner both sides of the pitch lock element 80 are exposed to the same pressure thereby permitting the springs to urge the lock element 80 toward a locked position. At the same time (see Fig. 7) the cam 110 will move to the dotted line position out of the slot 112 to mechanically unlatch the pitch lock.

Figure 5:
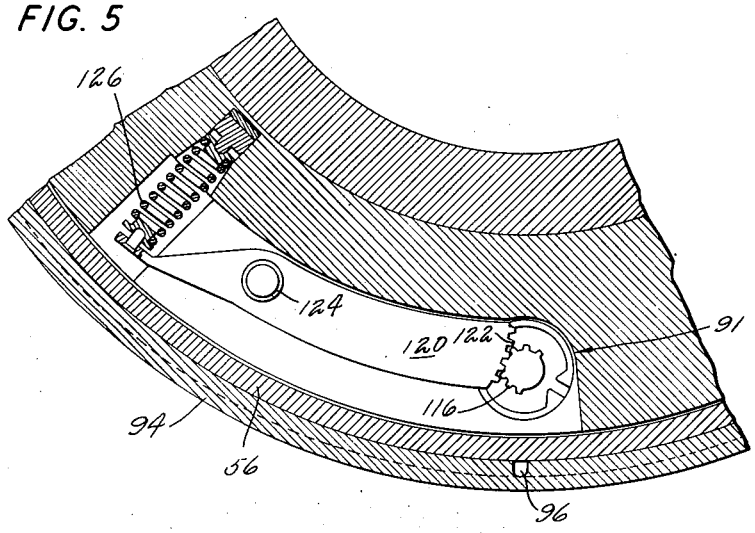
Fig. 5 is a partial detailed view of the centrifugal mechanism for controlling the pitch lock and latch.
Figure 6:
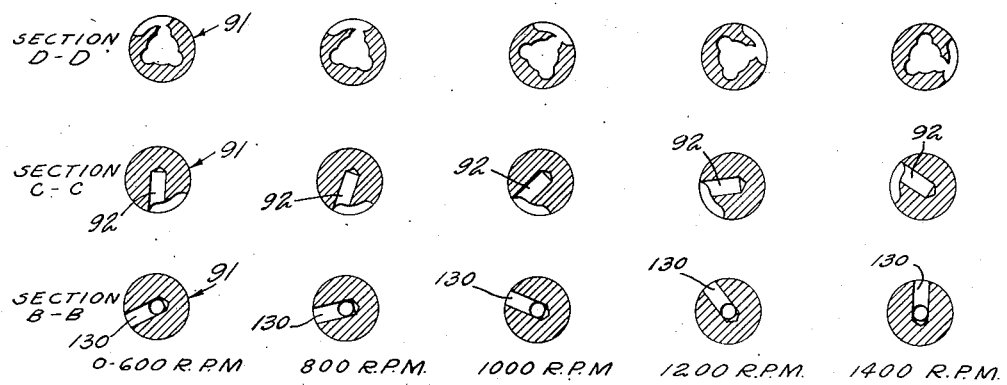
Fig. 6 is a combined illustration of various valve positions and taken along the lines B—B, C—C and D—D of Fig. 4.

The various rotational speeds shown in Fig. 6 for the various positions of the valve 91 are by example only since it is obvious that various positions may be obtained by changing the characteristics of the spring 126 which engages one end of the centrifugal element 120, shown in Fig. 5. It will be further apparent that the mechanism shown in Figs. 1 through 3 will operate identically to the mechanism shown in Figs. 4 through 7. The construction of the pitch lock elements 79 and 80 of this invention are further shown in patent application Serial No. 275,051, filed March 6, 1952, by David R. Pearl now U. S. Pat. No. 2,703,148.

As a result of this invention it is apparent that a substantially foolproof positive pitch lock mechanism has been provided which includes the latching mechanism described and which will prevent a pitch reduction when a predetermined propeller overspeed occurs regardless of the reason for such overspeed so that an overspeed condition is the sole signal for permitting the pitch lock to assume a locked position. In addition the invention prevents unlocking of the pitch lock until the propeller R. P. M. has returned to a predetermined value below the overspeed setting and until the propeller is also able to change pitch toward a higher blade angle.

Although only certain embodiments of this invention have been illustrated and described herein, it will be apparent that various modifications and changes may be made in the arrangement and construction of the various parts without departing from the scope of this novel concept.

What it is desired to obtain by Letters Patent is:

1. A variable pitch propeller including, a hub and a plurality of blades mounted for pitch changing movement relative to said hub, a pitch lock engageable with said blades and fixed for rotation with said hub, means for controlling the engagement and disengagement of said pitch lock, and a latch engageable with said pitch lock for holding said lock in a disengaged position.

2. A variable pitch propeller including, a hub and a plurality of blades mounted for pitch changing movement relative to said hub, a pitch lock engageable with said blades and fixed for rotation with said hub, means for controlling the engagement and disengagement of said pitch lock, a mechanical latch engageable with said pitch lock for normally holding said lock in disengaged position, and means responsible to a predetermined overspeed condition of the propeller for disengaging said latch.

3. A variable pitch propeller including, a hub and a plurality of blades mounted for pitch changing movement relative to said hub, a pitch lock engageable with said blades and fixed for rotation with said hub, means for controlling the engagement and disengagement of said pitch lock, a mechanical latch engageable with said pitch lock for normally holding said lock in disengaged position, and means responsible to a predetermined overspeed condition of the propeller for disengaging said latch and operating said lock controlling means.

4. A variable pitch propeller including, a hub and a plurality of blades mounted for pitch changing movement relative to said hub, a pitch lock engageable with said blades and fixed for rotation with said hub, means for controlling the engagement and disengagement of said pitch lock, and a latch engageable with said lock and operative to a disengaged position at a predetermined speed of rotation of said propeller.

5. A variable pitch propeller including, a hub and a plurality of blades mounted for pitch changing movement relative to said hub, a pitch lock engageable with said blades and fixed for rotation with said hub, means for controlling the engagement and disengagement of said pitch lock, a latch engageable with said pitch lock for normally holding said lock disengaged, and mechanism operative at a predetermined speed of rotation of the propeller for disengaging said latch.

6. In a propeller having variable pitch blades, means for varying the pitch of said blades, a hub carrying said blades for pitch changing movement relative thereto, means fixed for rotation with said hub and engageable with said blades for locking said blades against pitch changing movement, a source of fluid under pressure, fluid operated means for disengaging said locking means and operable by fluid from said source, means responsive to a predetermined speed of rotation of the propeller for controlling said fluid operated means, and latch mechanism for releasing said fluid operated means for movement into a locking position under control of said fluid control means upon a loss of pressure from said source.

7. In a propeller according to claim 6 wherein said latch mechanism includes a centrifugally operated mechanical latch engageable with said lock means.

8. In a propeller according to claim 6 wherein said speed responsive means and said latch mechanism are operatively connected together.

9. In a propeller according to claim 8 wherein said speed responsive means includes a centrifugally operated valve.

References Cited in the file of this patent

UNITED STATES PATENTS 2,274,334     Keller _____ Feb. 24, 1942

FOREIGN PATENTS 112,850     Australia _____ Apr. 24, 1941